United States Patent
Schramm et al.

[11] Patent Number: 5,844,956
[45] Date of Patent: Dec. 1, 1998

[54] APPARATUS AND METHOD FOR INSPECTING AN OUTER JACKET OF A CORE CONTAINMENT IN THE REGION OF A HEAT SHIELD SURROUNDING THE CORE CONTAINMENT

[75] Inventors: Herbert Schramm, Hoechstadt; Roland Gottfried, Langensendelbach; Erich Haas, Rueckersdorf, all of Germany

[73] Assignee: Siemens Aktiengesellschaft, Munich, Germany

[21] Appl. No.: 866,476

[22] Filed: May 30, 1997

Related U.S. Application Data

[63] Continuation of PCT/DE95/01673, Nov. 27, 1995 published as WO96/17358, Jun. 6, 1996..

[30] Foreign Application Priority Data

Nov. 30, 1994 [DE] Germany .......................... 44 42 621.6

[51] Int. Cl.⁶ ................................................ G21C 17/007
[52] U.S. Cl. ............................................ 376/249; 376/248
[58] Field of Search .................................... 376/245, 248, 376/249, 252, 287, 291, 292; 73/622, 623

[56] References Cited

U.S. PATENT DOCUMENTS

| | | | |
|---|---|---|---|
| 4,507,260 | 3/1985 | Fujimoto et al. | 376/249 |
| 4,518,560 | 5/1985 | Takaku et al. | 379/249 |
| 4,844,858 | 7/1989 | Fero et al. | 376/254 |
| 5,128,094 | 7/1992 | Müller et al. | 376/249 |

FOREIGN PATENT DOCUMENTS

| | | |
|---|---|---|
| 0418708A1 | 3/1991 | European Pat. Off. . |
| 3112201A1 | 10/1982 | Germany . |
| 2830908C2 | 6/1985 | Germany . |
| 3524390A1 | 1/1987 | Germany . |
| 9011617.8 | 12/1990 | Germany . |
| 4014161A1 | 11/1991 | Germany . |
| 8519751.3 | 3/1993 | Germany . |

*Primary Examiner*—Daniel D. Wasil
*Attorney, Agent, or Firm*—Herbert L. Lerner; Laurence A. Greenberg

[57] ABSTRACT

An apparatus and a method for inspecting an outer jacket of a core containment in the vicinity of a heat shield surrounding the core containment, include an annular rail to be fixed to the core containment. A carriage is disposed on the annular rail for circumferential movement. A mast is supported on the carriage for axial displacement. A vertical carriage is movable along the mast in the direction of the longitudinal axis of the mast. An outrigger is disposed on the vertical carriage. An inspection device is carried by the free end of the outrigger for movement into a region between the outer jacket and the heat shield.

8 Claims, 4 Drawing Sheets

APPARATUS AND METHOD FOR INSPECTING AN OUTER JACKET OF A CORE CONTAINMENT IN THE REGION OF A HEAT SHIELD SURROUNDING THE CORE CONTAINMENT

CROSS-REFERENCE TO RELATED APPLICATION

This application is a continuation of International Application Serial No. PCT/DE95/01673, filed Nov. 27, 1995, published as WO96/17358, Jun. 6, 1996.

BACKGROUND OF THE INVENTION

Field of the Invention

The invention relates to an apparatus and a method for inspecting an outer jacket of a core containment in the region of a heat shield surrounding the core containment.

In order to monitor the safety of nuclear power plants, safety-relevant plant parts that undergo severe strain during regular operation must be subjected to checking and inspection at regular intervals. Those parts also include the core containment or core encompassing screws that are disposed on the outer jacket of a core containment that receives the core fittings. However, those core containment screws are poorly accessible in some plants, since the core containment is closely surrounded there by a heat shield. Only a small gap, which may measure between 16 and 50 mm, for instance, and is difficult to check from outside, remains between the heat shield and the outer jacket of the core containment.

SUMMARY OF THE INVENTION

It is accordingly an object of the invention to provide an apparatus and a method for inspecting an outer jacket of a core containment in the region of a heat shield surrounding the core containment, which overcome the hereinafore-mentioned disadvantages of the heretofore-known apparatuses and methods of this general type and which make inspection possible in a spatially restricted region between the core containment and the heat shield surrounding the core containment.

With the foregoing and other objects in view there is provided, in accordance with the invention, an apparatus for inspecting an outer jacket of a core containment in the vicinity of a heat shield surrounding the core containment and defining a region between the core containment and the heat shield, comprising an annular rail to be fixed to the core containment; a carriage disposed on the annular rail for circumferential movement; a mast supported on the carriage for axial displacement, the mast having a longitudinal axis; a vertical carriage to be moved along the mast in the direction of the longitudinal axis of the mast; an outrigger disposed on the vertical carriage and having a free end; and an inspection device carried by the free end of the outrigger for movement into the region between the outer jacket and the heat shield.

In accordance with another feature of the invention, the outrigger is disposed displaceably on the vertical carriage crosswise to the longitudinal axis of the mast.

In accordance with a further feature of the invention, a chain is provided as the outrigger.

In accordance with an added feature of the invention, the outrigger has a free end which receives an inspection equipment carrier that is movable in its longitudinal direction.

In accordance with an additional feature of the invention, there is provided a video camera disposed on the inspection equipment carrier.

In accordance with yet another feature of the invention, there is provided a test head for nondestructive materials testing, the test head is disposed on the inspection equipment carrier so as to be displaceable crosswise to the longitudinal axis of the outrigger.

In accordance with yet a further feature of the invention, the heat shield is made up of spatially separate annular segments, and the outrigger extends crosswise to the longitudinal axis of the mast, is adapted to the curvature of the core containment and is displaceable in the circumferential direction.

With the objects of the invention in view there is also provided a method for inspecting an outer jacket of a core containment in the vicinity of a heat shield surrounding the core containment, which comprises securing an annular rail to a core containment having an outer jacket; mounting a carriage on the annular rail for sliding in a circumferential direction; supporting a mast on the carriage for axial displacement; placing a vertical carriage on the mast for movement in the direction of a longitudinal axis of the mast; placing an outrigger on the vertical carriage; carrying an inspection device on a free end of the outrigger; and moving the outrigger into a region between the outer jacket of the core containment and a heat shield surrounding the core containment.

Other features which are considered as characteristic for the invention are set forth in the appended claims.

Although the invention is illustrated and described herein as embodied in an apparatus and a method for inspecting an outer jacket of a core containment in the region of a heat shield surrounding the core containment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
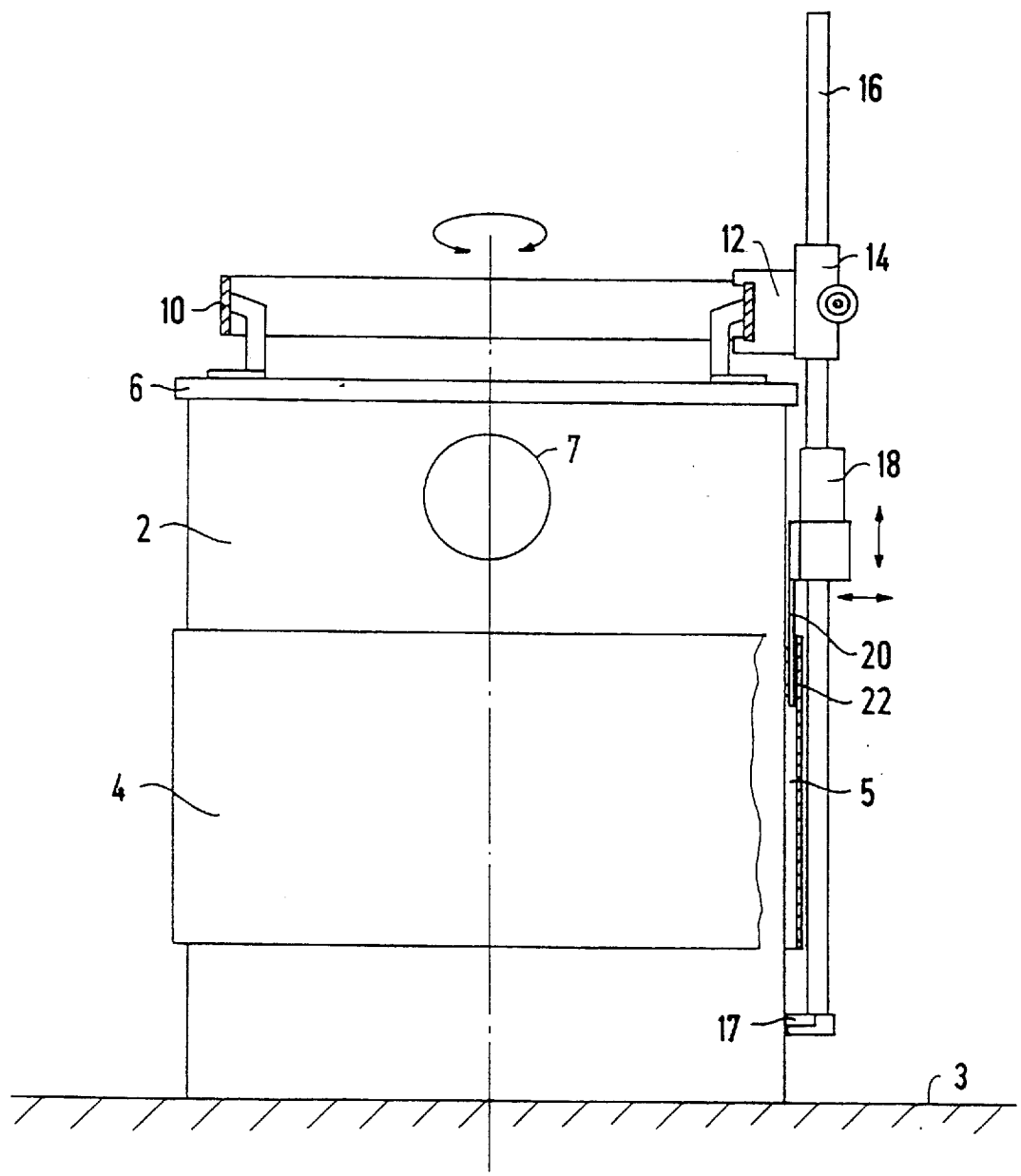
FIG. 1 is a fragmentary, diagrammatic, elevational view of an apparatus according to the invention, which is placed into a checking position on a core containment.

Referring now to the figures of the drawings in detail and first, particularly, to FIG. 1 thereof, there is seen a core containment 2 which is placed on a bottom 3 of a storage basin. The core containment 2 is surrounded over a portion of its outer jacket by a heat shield 4. A narrow gap or region 5 between the core containment 2 and the heat shield 4 may range from 16 mm to 50 mm, depending on the specific embodiment.

An annular rail 10 of the core containment 2 is disposed on an upper edge 6 of the core containment 2 in such a way that a center axis of the core containment 2 and a center axis of the annular rail 10 coincide. A carriage 12 that is movable in the circumferential direction is mounted for sliding on the annular rail 10 and carries a mast guide 14, in which a mast 16 is supported so as to be displaceable axially, or in other words parallel to the center axis of the annular rail 10.

The mast 16 is disposed outside the gap 5 formed by the heat shield 4 and has a free end supported for stabilization on the outer jacket of the core containment 2 through rollers 17 below the heat shield 4. The mast 16 carries a vertical carriage 18, which is disposed on the mast 16 in such a way as to be displaceable in the longitudinal direction thereof.

An outrigger or arm 20 which is disposed on the vertical carriage 18 has a free end that can be introduced into the space or gap 5 located between the heat shield 4 and the core containment 2. The outrigger 20 is supported in the vertical carriage 18 in such a way as to be movable parallel to its longitudinal axis, in order to make it possible for the outrigger or arm 20 to be moved into the gap 5, even when space is tight. In a preferred embodiment, a telescoping outrigger that can be deployed parallel to the longitudinal axis of the mast 16 is provided as the outrigger 20. With such a telescoping outrigger, even relatively deep checking positions in the gap 5 can be reached. The outrigger 20 is also displaceable crosswise to the longitudinal axis of the mast 16 and perpendicular to the circumferential direction of the core containment 2, or in other words it can be positioned radially while supported on the vertical carriage 18, to enable accurate positioning above the gap 5. This radial positioning motion of the outrigger 20 is necessary on one hand to get around obstacles to the motion of the vertical carriage 18, and on the other hand after circumventing these obstacles, it is necessary in order to make it possible to position the outrigger 20 above the gap 5. Such obstacles are provided, for instance, by a flange on the upper edge 6 protruding beyond the jacket of the core containment 2, or by an outlet neck 7 protruding beyond the jacket surface of the core containment 2.

An inspection equipment carrier 22 for an inspection device needed for inspection purposes, such as a video camera and/or an ultrasound test head, is disposed on the free end of the outrigger 20.

Figure 2:
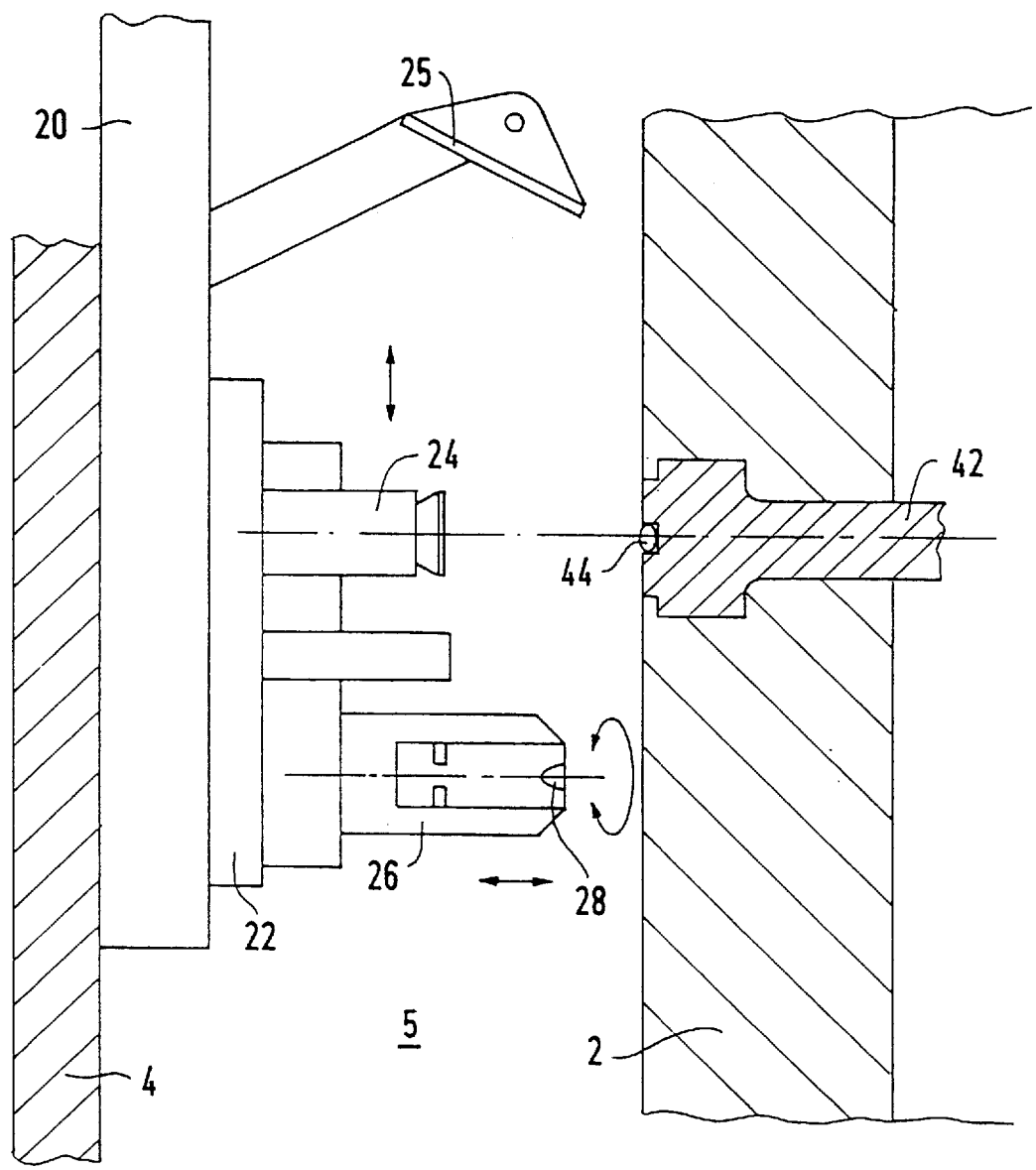
FIG. 2 is an enlarged, fragmentary, sectional view of an outrigger of the apparatus according to the invention that protrudes into a space between a heat shield and the core containment.

In FIG. 2, it is seen that the free end of the outrigger or arm 20 is introduced into the annular gap 5 between the heat shield 4 and the core containment 2. The free end of the outrigger 20 has a carriage guide, disposed parallel to its longitudinal direction, on which the inspection equipment carrier 22 that is constructed as a carriage is mounted for sliding, so that the inspection equipment carrier 22 is vertically displaceable. The inspection equipment carrier 22 in the illustrated example contains both a video camera 24 and a test head 26 for nondestructive material testing, such as an ultrasound test head.

The test head 26 is supported on the inspection equipment carrier 22 in such a way as to be rotatable about a pivot axis that is oriented at right angles to the longitudinal direction of the outrigger 20 and at right angles to the circumferential direction of the core containment 2. The test head 26 is also displaceable on the inspection equipment carrier 22 in the direction of this pivot axis.

With the aid of the video camera 24, the inspection equipment carrier 22 can be aimed exactly at a screw 42 to be tested in the core containment 2. To that end, the screw 42 is moved precisely into a predetermined image position on a surveillance monitor. Due to the fixed spacing between the video camera 24 and the test head 26, the test head can thereupon be moved exactly into a position above the screw 42 and placed precisely on the head of the screw 42, which in the illustrated example is provided with a securing pin 44.

The rotatability of the test head 26 is necessary so that the test head 26, which has a surface shape that is adapted to the shape of the head of the screw 42, can be aligned correctly with the orientation of the head of the screw. In the exemplary embodiment, the screw 42 is a slot bolt having the securing pin 44, with which a groove 28 located in a coupling surface of the test head 26 must be aligned.

Figure 3:
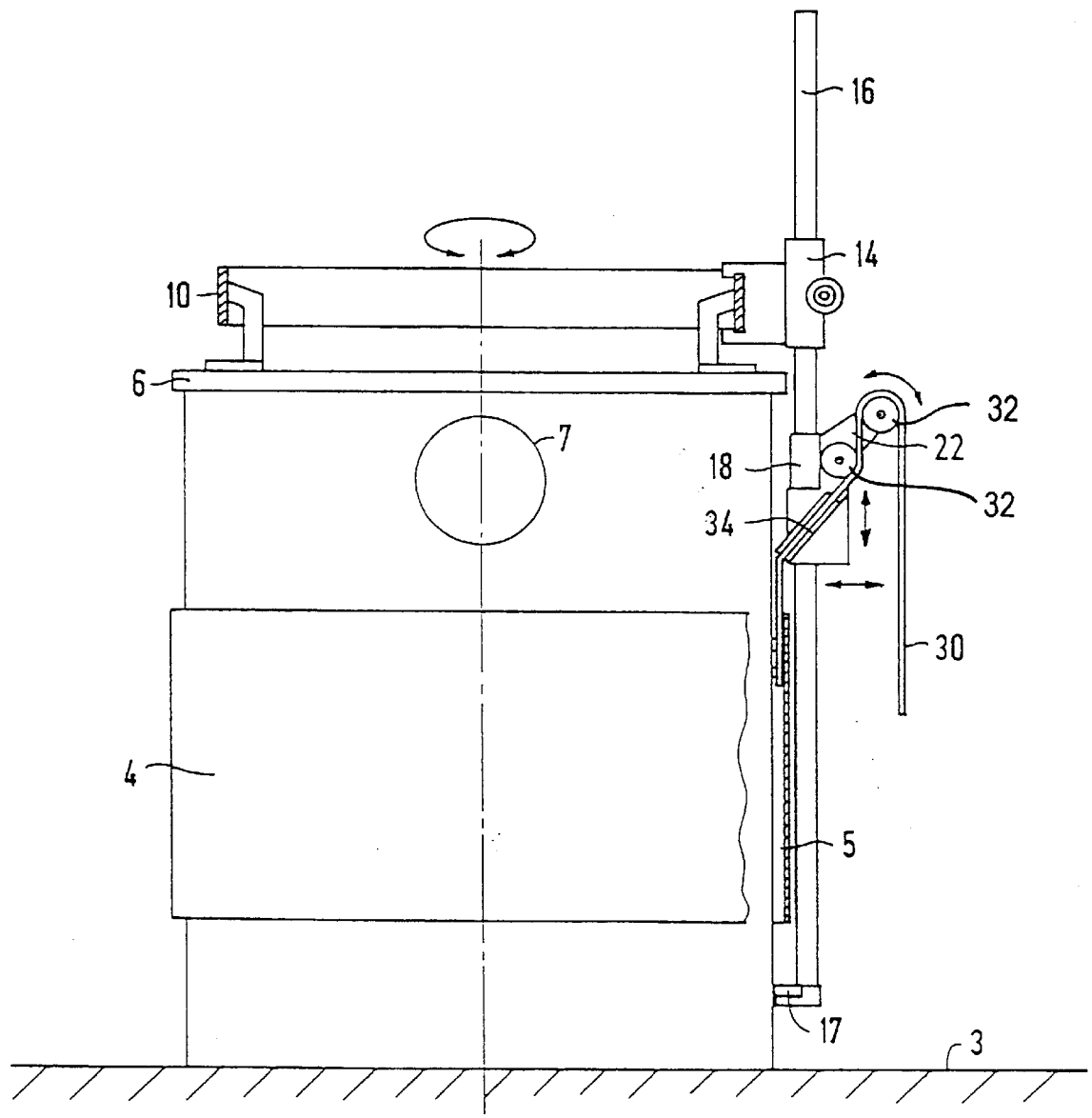
FIG. 3 is a fragmentary, elevational view of another advantageous feature of the invention, in which a chain is provided as the outrigger.

FIG. 3 shows a further advantageous feature of the invention, in which a chain 30 is provided as the outrigger and is guided by guide rollers 32 disposed on the inspection equipment carrier 22 on the vertical carriage 18. A chain guide 34 is provided on the vertical carriage 18 for guiding the chain 30. This guide can be displaced crosswise to the longitudinal direction of the mast 16 and to the circumferential direction of the core containment 2 for accurate positioning of the free end of the chain 30. The dimensions of links of the chain 30 are adapted to the gap 5, so that the chain 30 hanging inside the gap 5 is prevented from swinging back and forth.

Figure 4:
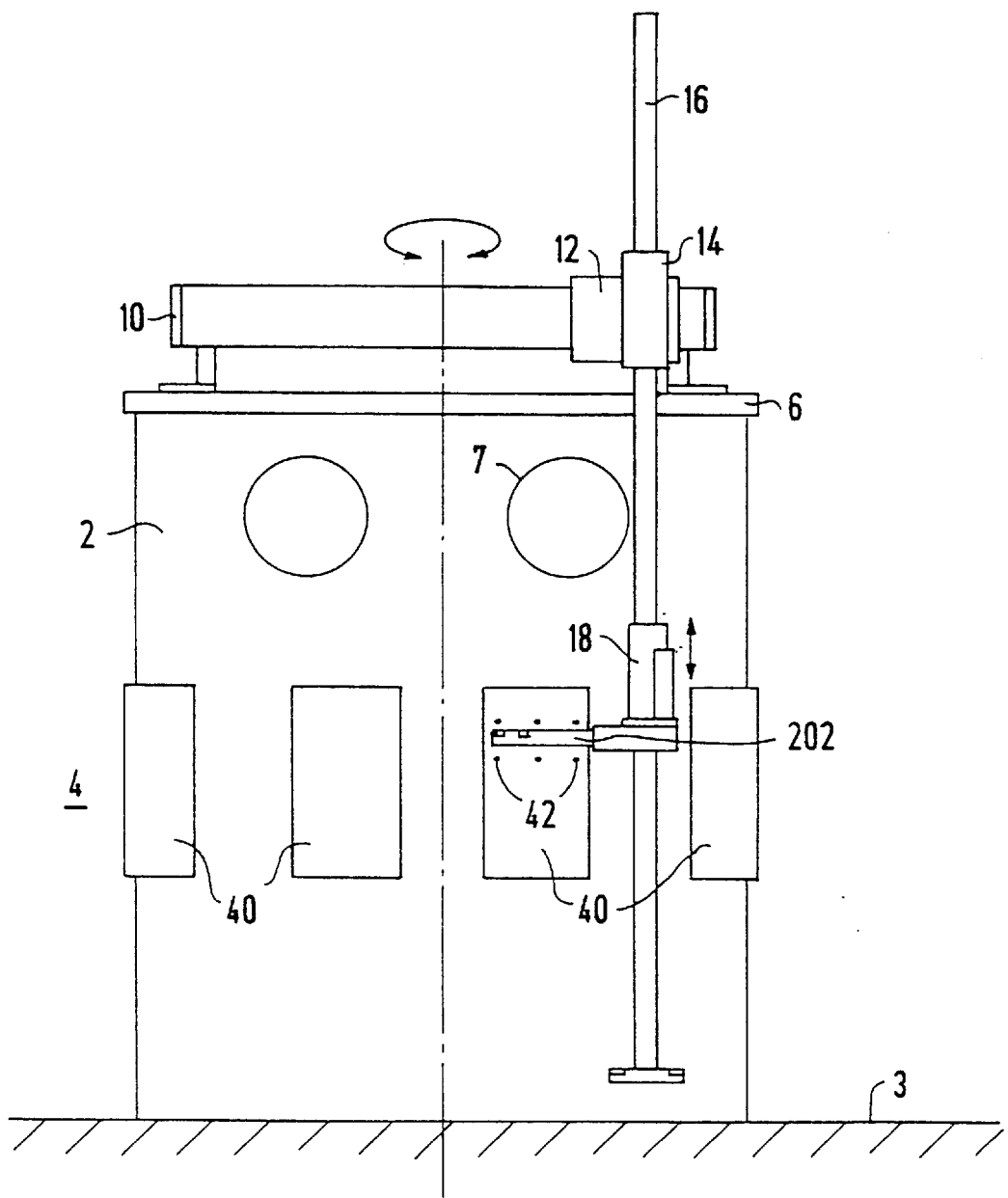
FIG. 4 is an elevational view of an apparatus which is suitable in particular for use with segmentally constructed heat shields.

In the exemplary embodiment of FIG. 4, the core containment 2 is surrounded by a heat shield 4 that includes a plurality of spatially separate annular segments 40. In this case, an outrigger 202, preferably a telescoping outrigger or arm, that extends crosswise to the longitudinal axis of the mast 16, can be disposed on the vertical carriage 18. In accordance with FIG. 5, this outrigger is curved to match the curvature of the wall of the core containment 2 and is circumferentially displaceably supported on the vertical carriage 18.

Figure 5:
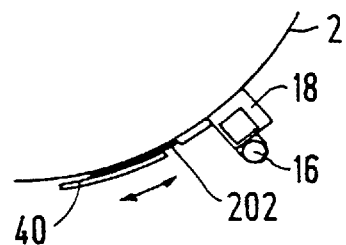
FIG. 5 is a fragmentary, sectional view showing a portion of the embodiment of FIG. 4.

The embodiment of the outrigger shown in FIGS. 4 and 5 makes it possible to check core encompassing screws, which are poorly accessible from above, particularly with such structural forms of the heat shield, because of closely spaced screws 42 with which the heat shield 4 is fixed to the core containment 2.

In the case of the outriggers shown in the exemplary embodiments of FIGS. 3–5, a carriage guide for an inspection equipment carrier as shown in FIG. 2 is also disposed on the free end of each outrigger, so that when the outrigger is in repose, the inspection equipment carrier can be moved in the longitudinal direction thereof.

We claim:

1. In an assembly having a core containment with an outer jacket and a heat shield surrounding the core containment and defining a region between the core containment and the heat shield, an apparatus for inspecting the outer jacket in the vicinity of the heat shield, the apparatus comprising:

a) an annular rail to be fixed to the core containment;

b) a carriage disposed on said annular rail for circumferential movement;

c) a mast supported on said carriage for axial displacement, said mast having a longitudinal axis;

d) a vertical carriage to be moved along said mast in the direction of the longitudinal axis of said mast;

e) an outrigger disposed on said vertical carriage and having a free end; and f) an inspection device carried by said free end of said outrigger for movement into the region between the outer jacket and the heat shield.

2. The apparatus according to claim 1, wherein said outrigger is displaceable on said vertical carriage crosswise to the longitudinal axis of said mast.

3. The apparatus according to claim 1, wherein said outrigger is a chain.

4. The apparatus according to claim 1, including an inspection equipment carrier carrying said inspection device and having a longitudinal direction, said inspection equipment carrier being disposed on said free end of said outrigger for movement in the longitudinal direction of said inspection equipment carrier.

5. The apparatus according to claim 4, wherein said inspection device includes a video camera disposed on said inspection equipment carrier.

6. The apparatus according to claim 4, wherein said outrigger has a longitudinal axis, said inspection device includes a test head for nondestructive materials testing, and said test head is disposed on said inspection equipment carrier for displacement crosswise to the longitudinal axis of said outrigger.

7. The apparatus according to claim 1, wherein the core containment has a curvature, the heat shield has spatially separate annular segments, and said outrigger extends crosswise to the longitudinal axis of said mast, is adapted to the curvature of the core containment, has a circumferential direction and is displaceable in the circumferential direction.

8. A method for inspecting an outer jacket of a core containment in the vicinity of a heat shield surrounding the core containment, which comprises:

a) securing an annular rail to a core containment having an outer jacket;

b) mounting a carriage on the annular rail for sliding in a circumferential direction;

c) supporting a mast on the carriage for axial displacement;

d) placing a vertical carriage on the mast for movement in the direction of a longitudinal axis of the mast;

e) placing an outrigger on the vertical carriage;

f) carrying an inspection device on a free end of the outrigger; and g) moving the outrigger into a region between the outer jacket of the core containment and a heat shield surrounding the core containment.

* * * * *